May 2, 1933.  J. M. MITCHELL  1,906,916
SETTLING APPARATUS
Filed June 6, 1930  4 Sheets-Sheet 2

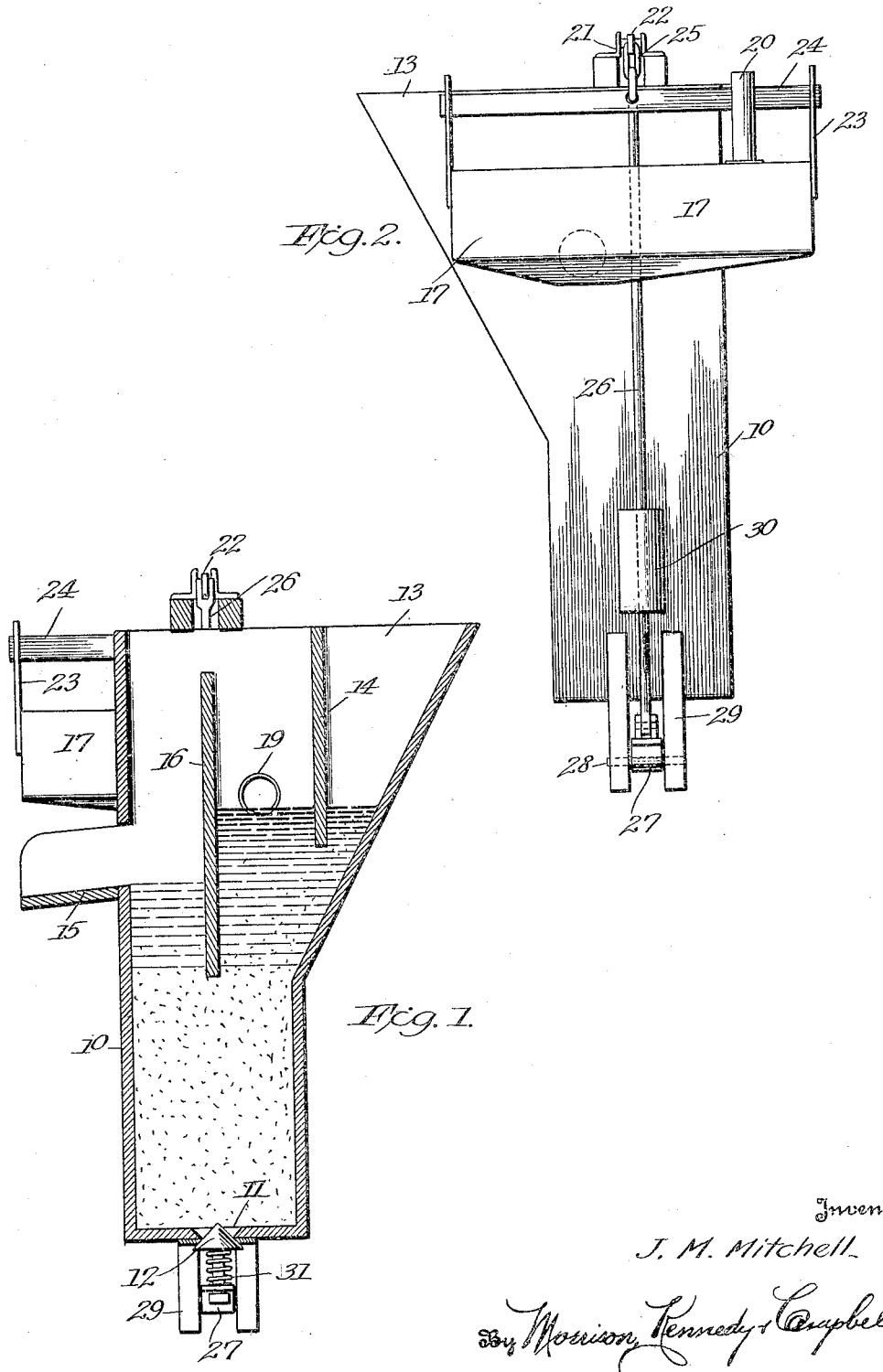

Inventor
J. M. Mitchell
By Morrison, Kennedy & Campbell
Attorneys

May 2, 1933.   J. M. MITCHELL   1,906,916
SETTLING APPARATUS
Filed June 6, 1930   4 Sheets-Sheet 3
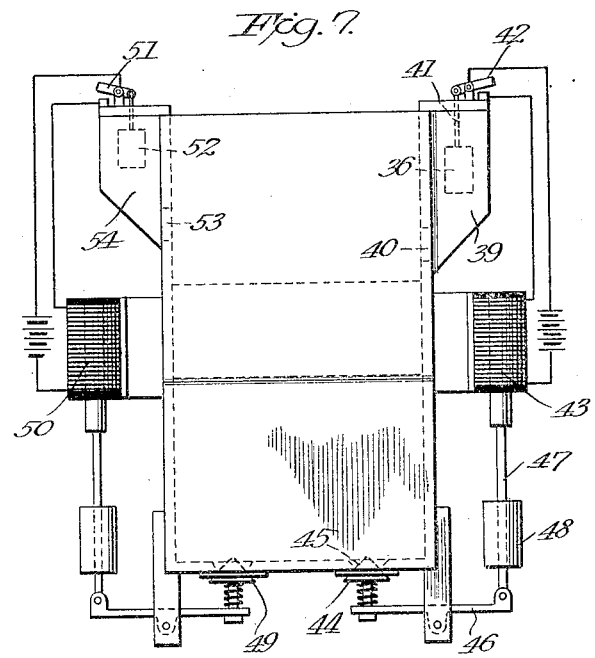
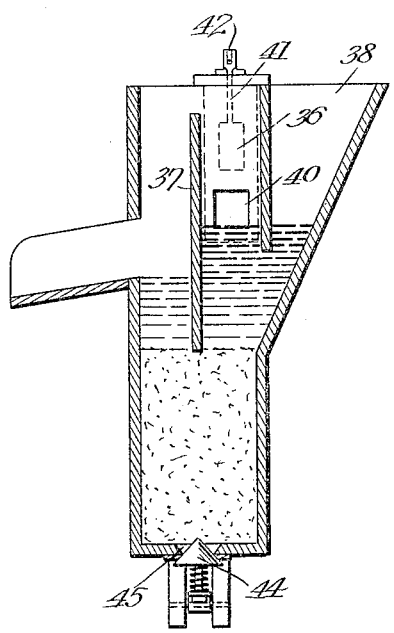
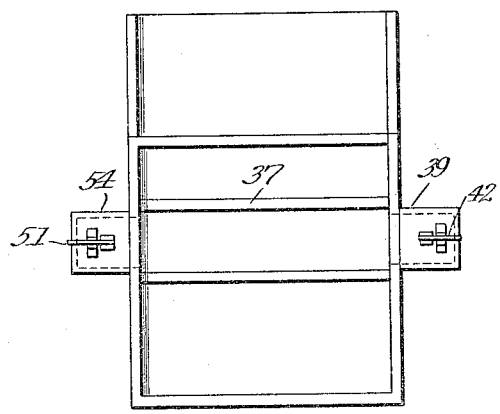
Inventor
J. M. Mitchell
By Morrison, Kennedy & Campbell
Attorneys May 2, 1933. J. M. MITCHELL 1,906,916
SETTLING APPARATUS
Filed June 6, 1930 4 Sheets-Sheet 4

Inventor
J. M. Mitchell
By Morrison, Kennedy & Campbell
Attorneys

Patented May 2, 1933

1,906,916

UNITED STATES PATENT OFFICE

JAMES MACDONALD MITCHELL, OF FLUSHING, NEW YORK

SETTLING APPARATUS

Application filed June 6, 1930. Serial No. 459,464.

This invention relates to improvements in settling apparatus or mechanisms in which solids may be separated from wash water, dirt and other foreign substances and more particularly to a settling apparatus adapted to discharge settled materials in accordance with the quantity of the materials settled, regardless of their weight.

It is an object of this invention to provide a settling apparatus adapted to continuously receive a supply of solids suspended in or accompanied by liquid, which will discharge the waste liquid and foreign matter through one discharge outlet and discharge the settled materials separated from the liquid and foreign matter through a second discharge outlet, and to provide means for controlling the respective discharge outlets in accordance with the quantity of materials settled.

It is another object of this invention to provide actuating means for controlling the discharge of settled materials from a settling apparatus operable in accordance with the level of unsettled materials supplied to the tank.

It is a further object of this invention to provide in connection with a settling tank means for controlling the level of the incoming unsettled supply, and to provide additional means operable in accordance with variations in level of such supply to control the discharge of the settled materials from the tank.

It is a further object of this invention to provide in connection with a settling tank having separate discharge outlets for the settled materials and the waste materials, means cooperating with the settled materials to variably restrict flow to the waste outlet and in accordance with such restriction to cause variations in level of the incoming unsettled supply, additional means operable in accordance with the level of the unsettled supply being provided to control discharge of the settled material.

It is a further object of this invention to provide a settling apparatus having a plurality of outlets through which settled materials may be discharged and to provide means for controlling discharge through the respective outlets in accordance with the quantity of material settled, said controlling means being so designed as to actuate one of said outlets only when materials are settled in the tank so rapidly as to render it impossible for the other outlet to discharge the settled materials at a rate proportionate to that at which they are settled.

It is another object of this invention to provide a settling tank provided with a plurality of discharge outlets and to provide means in said tank adapted to cause various grades of material to settle in such position as to be dischargeable through the respective outlets, means being further provided to control said discharges in accordance with the level of unsettled materials in the tank which, in turn, will be dependent upon the quantity of any particular grade of material settled.

It is still another object of this invention to provide means for controlling the discharge of materials from a settling tank in accordance with the level of the unsettled supply, such controlling means taking the form either of a device actuatable in accordance with variations in level of the supply as such or a device actuatable in accordance with the quantity of unsettled supply rising to a particular level.

In its general construction my invention contemplates the provision of a tank associated with a source of supply of materials to be settled. At the lower end of the tank are located one or more discharge valves adapted to discharge settled materials and actuated by suitable mechanism operable in accordance with the level of unsettled materials in the tank as determined by the quantity of materials settled.

Inasmuch as my device is capable of a wide range of modification and equivalency, I do not intend to limit myself to the particular features of construction and arrangement of parts shown in the accompanying drawings, and hereafter described in detail, but on the other hand, I wish it to be understood that I claim all similar and equivalent structures falling within the scope of my invention as determined by the appended claims.

Fig. 1 is a view in vertical section showing a settling apparatus involving the basic features of my invention;

Fig. 2 is a view in side elevation of the structure shown in Fig. 1 disclosing in particular one type of actuating means for controlling the discharge;

Fig. 5 is a view in vertical section disclosing a structure having the general features of the structure shown in Fig. 1 showing how a different valve discharge actuating device may be adapted to such structure;

Figs. 6 and 7 show settling tanks corresponding with the structure shown in Figs. 4 and 3 showing the manner in which the actuating device shown in Fig. 5 may be applied to such structure;

Figure 8:
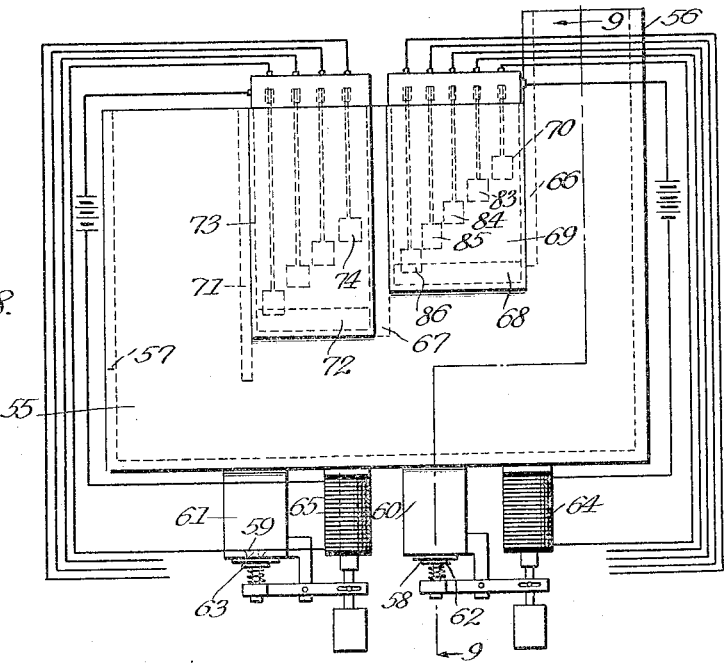
Figure 9:
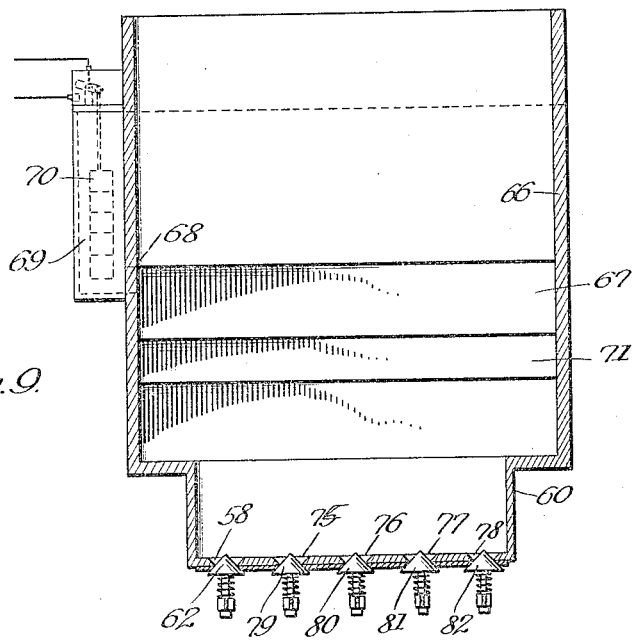

Fig. 8 discloses a settling apparatus utilizing the basic features of construction of the device shown in Fig. 5 adapted to both classify and discharge settled materials; and Fig. 9 is a view in vertical section taken along the line 9—9 of Fig. 8.

In Fig. 1 I have shown a settling apparatus embodying the basic features of my invention. A tank, generally denoted by reference numeral 10, is provided in its lower portion with a discharge 11 controlled by a valve 12 adapted to allow discharge of materials settled in the tank. An intake 13, preferably at or near the top of the tank, is provided for introducing a supply of materials from any suitable source. Baffle 14 for the purpose of controlling the supply separates the intake from the main portion of the tank. An overflow outlet 15 is also provided and is located so as to be below the level of the supply intake, but preferably substantially above the bottom of the tank. Positioned between the supply intake and the overflow outlet is a partition or baffle 16 extending from the top of the tank to a point substantially below the overflow outlet. As the supply is introduced into the tank the heavier materials which are to be separated will settle to the bottom, while the waste materials will pass out through the overflow outlet. When materials have settled in the tank up to the bottom of the partition, the overflow outlet will be cut off from the supply side of the partition, hence causing the incoming supply to rise in the tank. Located on the supply side of the partition, at such level as may be desired, is a device responsive to variations in level of the supply and connected with the valve discharge in the lower portion of the tank, whereby as the level of the liquid rises or falls the valved discharge will open and close, thus to control the discharge of the settled materials from the tank.

It will be obvious to those skilled in the art, with the general structural arrangement just described, various means may be provided actuatable in accordance with the level of the supply to control the valved discharge. As shown in Figs. 1 and 2 and more clearly shown in Fig. 3, the discharge controlling means may comprise an auxiliary tank 17 in open communication with the main tank through a flexible hose connection 18 (see Fig. 3) associated with an opening 19 in the side of the tank. The auxiliary tank is preferably closed to prevent splashing and provided with a vent 20. The bottom of the tank is preferably sloped towards the hose connection in order to facilitate the emptying of the tank when the level of the unsettled supply in the main tank falls below the opening 19. To properly support the auxiliary tank, an arm 21 attached to the main tank supports a member 22 which is fulcrumed thereon, one end being associated with the auxiliary tank through or by means of straps such as 23 and a connecting bar 24, the latter of which is linked to the member 22 through a connection 25. The other end of the bar 22 is connected to the discharge valve 12 through connecting rods 26 and 27. The arm 27 is pivotally secured to a support 29 associated with the main tank by a pin 28. A weight 30 is provided for the purpose of ordinarily maintaining the discharge valve closed. Such weight may be located at any suitable place to accomplish this purpose, and as shown may be conveniently attached to the rod 26. To facilitate the proper seating of the valve 12, a spring 31 is provided between the arm 27 and the body of the valve. It will be understood, of course, that any suitable type of valve arrangement may be used, the only requisites being that it may efficiently close the discharge when in position and in addition may be freely actuatable by means such as that just described to open the discharge at the proper time.

With an actuating mechanism such as that described, it will be evident that as the material in the tank rises to the bottom of the baffle 16 the level of the unsettled supply will rise in the tank until the same has reached the level of the opening 19, whereupon portions of the unsettled material will pass into the tank 17. As the level of the unsettled material continues to rise in the main tank, the quantity flowing into the auxiliary tank will increase until the weight thereof is sufficient to cause the tank to move downwardly about its flexible connection, thus causing the arm 22 to pivot and, through the agency of the linking arms 26 and 27, to cause the discharge valve to be opened against the opposing weight 30. The time at which such action will occur may be determined by properly proportioning the size of the auxiliary tank with respect to the counter-weight 30 and, more particularly, by the proper location of the opening between the main and auxiliary tank with respect to the height of the tank.

Figure 3:
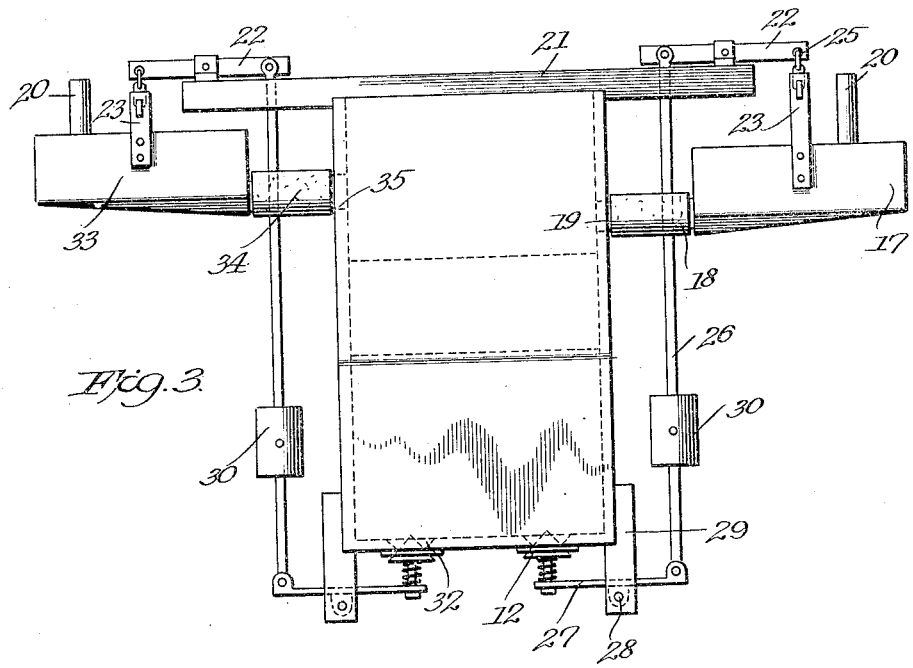
Fig. 3 is a view in rear elevation of the structure disclosed in Figs. 1 and 2, showing the manner in which additional discharges may be provided to be controllable by actuating means similar to that shown in Fig. 2.
Figure 4:
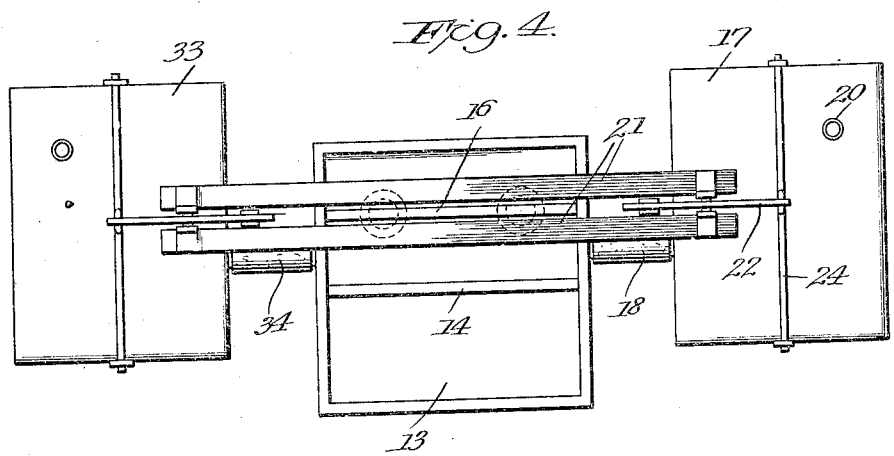
Fig. 4 is a top side view of the structure shown in Fig. 3.

Referring now to Figs. 3 and 4, I have shown another view of the tank disclosed in Fig. 1, illustrating how a second discharge valve and actuating device similar to that heretofore described may be utilized, the purpose of such construction being the provision of an emergency discharge and discharge controlling means adapted to operate only when the primary discharge valve is inadequate to properly discharge the materials as they settle. Thus, when the flow of the supply into the tank is rapid and, more particularly, when such supply contains a large quantity of materials which will be settled in the bottom of the tank, the discharge 11 controlled by the valve 12, as shown in Figs. 1 and 2, may be insufficient to discharge the materials as they settle, whereupon the tank is likely to overflow. In Fig. 3 I have denoted the emergency discharge by the reference numeral 32, the latter of which is controlled through an auxiliary tank 33 which actuates said valve through a mechanism identical with that described in connection with the main valve 12. The auxiliary tank 33 is in open communication with the main tank through a hose 34 and an opening in the main tank 35. To enable this structure to act only as an emergency discharging device, it will, of course, be obvious that the opening 35 in the main tank will be located at a higher level than the opening 19 which determines the actuation of the main discharge valve 12. While I have described this second discharge valve and controlling means as an emergency device, it will, of course, be obvious that the same may be used simultaneously with the main discharge valve and actuating mechanism merely by locating the openings 19 and 35 in the main tank at the desired levels with respect to each other and with respect to the height of the main tank.

As pointed out heretofore, various expedients may be resorted to, such as that generally disclosed in Fig. 1, for actuating the discharge valve in accordance with variations in level of the supply. It will be clear from the previous discussion that the actuating means used in connection with the structures shown in Figs. 1 to 4 will actuate the discharge valve in accordance with the quantity and weight of unsettled materials in the tank which rise up to a certain level, to wit, the level of the opening between the main tank and the auxiliary tank.

In Figs. 5 through 8, I have shown another type of actuating mechanism, simple in construction, which will efficiently serve to control the discharge of settled materials from the tank according to the rise in level of the unsettled supply caused by materials settling in the tank to a predetermined level. In Fig. 5 I have shown a float operated switch in connection with a tank construction identical with that shown in Fig. 1. As shown more clearly in Fig. 7, this type of discharge valve actuating mechanism will comprise a float 36 which, preferably, is located either in the main part of the tank on the same side of a partition or baffle 37, as a supply intake 38, or if desired and as shown in these figures the float may be located in chamber 39 in open communication with the tank through an opening 40. As the level of the unsettled supply rises to and above the opening 40, the same will pass into the chamber 39 to cause the float 36 to rise. Connected with the float 36 by an arm 41 is an electrical switch 42 which will make and break contact in accordance with variations in level of the float, as determined by the level of material in the tank and in the chamber. The switch 42 controls an energizing circuit of a magnet 43 which will open and close the valve 44 of a discharge 45 through suitable arms 46 and 47, similar in arrangement to the connecting mechanism shown in and described with respect to Figure 1. As the level of unsettled material rises in the tank, the float will be moved upwardly due to its buoyancy to close the switch 42, thus completing the energizing circuits of the magnet 43 to draw the arm 47 upwardly and cause the valve 44 to open. When the level in the tank and chamber falls, the float will move downwardly breaking the circuit and causing the valve 44 to be closed by the counter-weight 48 which may be conveniently disposed on the arm 47. If desirable the single switch 42 may be constructed as a two-way switch and another magnet substituted for the counter-weight 48, whereby as the float falls the second magnet may be energized to act as a positive valve closing mechanism in place of the counter-weight 48.

In Fig. 7 I have shown an arrangement of a magnetic valve discharge actuating mechanism as applied to a tank having a plurality of valved discharges with a separate actuating mechanism for each valved discharge. This construction corresponds in its general arrangement with the structure shown in Fig. 3. A second discharge valve 49 actuatable by an electromagnet 50 is controlled by a switch 51, the movement of which is determined by a float 52 corresponding to and arranged in the same manner as the floats 36 heretofore described. The opening 53 into the chamber 54 in which the float 52 is located may be on the same level as the opening 40 of the chamber 39, in which case the valves 44 and 49 will be actuated simultaneously or may be positioned above the opening 40, with the result that the float 52 will actuate the valve 49 only in case the discharge 45, controlled by the valve 44, is inadequate to discharge materials as rapidly as they settle.

In Figs. 8 and 9 I have shown a settling apparatus embodying the essential features of the structures shown in Figs. 1 and 5 with discharge valves operated by electromagnetic actuating mechanisms shown and described in connection with Figs. 5 and 7. The actuating mechanism utilized in connection with the structure shown in Figs. 1 and 2 or any other type of actuating mechanism may be utilized in connection with this structure, the only essential requirement being that the actuating mechanism operate the discharge valves in accordance with the level of unsettled material in the tank.

Referring now to Fig. 8, I have shown a tank 55 provided with a supply intake 56 and an overflow outlet 57. The supply intake and the valve discharge are preferably located at opposite sides of a relatively wide tank for the purpose of allowing materials of various grades to be distributed along the bottom of the tank between the intake and the overflow outlet. As the supply is introduced into the tank through the intake, there will be a constant flow to the overflow outlet and the heaviest materials will be settled more quickly while the lighter materials will be carried in suspension farther towards the overflow outlet before they are deposited on the bottom of the tank. By locating a plurality of discharges such as 58 and 59 in the bottom of the tank and preferably at the lower end of pockets 60 and 61, respectively, associated with the bottom of the tank as shown, it will be possible to effect discharge of the various grades of material through the respective discharges. The discharges 58 and 59 are controlled respectively by valves 62 and 63, the said valves being actuatable by electromagnets 64 and 65 in connection with energizing circuits controlled by float actuated switches hereafter to be described. If desirable, any other suitable type of valve actuating mechanism may be utilized.

To control the flow of supply from the intake into the main portion of the tank is a baffle 66. A second baffle 67 is located between the supply intake and the overflow outlet extending from the top of the tank down to a point sufficiently above the bottom of the tank to allow considerable material to be settled before the level of such material will reach the bottom of the baffle, and thus cut off the overflow outlet from the supply intake. The baffle 67 is so located with respect to the pocket 60 in which is located the discharge 58 that any materials settling between said baffle and the supply intake may be discharged into said pocket and out through said discharge. Located on one side of the tank and in open communication therewith through an opening 68 is a chamber 69, said chamber being so positioned as to be in communication with a portion of the tank between baffles 66 and 67. In said chamber 69 are one or more floats such as 70 adapted to actuate a suitable switch for controlling an energizing circuit for magnets such as 64 which actuate the discharge valve such as 62. A third baffle 71 is located between the baffle 67 and the overflow outlet 57. This baffle extends from the top of the tank downwardly to a point below the lowest extremity of the baffle 67 and is so positioned with respect to the pocket 61 in which is located the discharge 59 that any materials on the supply side of the baffle which settle in the vicinity of the pocket 61 may be discharged through the discharge 59 as materials settle in the tank to sufficient height to meet the lower end of said baffle, thus cutting off the overflow outlet. Located on the side of the tank so as to be in open communication therewith, through an opening 72, is a chamber 73 corresponding to the chamber 69 lying between the baffles 66 and 67. In the chamber 73 are located floats such as 74 adapted to control an energizing circuit for a discharge valve actuating magnet such as 65.

Considering now the operation of the structure just described, a supply will be introduced through the intake 56 which will pass downwardly to the bottom of the tank and as the level rises therein waste material will pass out through the overflow outlet 57. The coarser materials to be settled being heavier will settle to the bottom of the tank over an area relatively near the intake. The discharge 58 is adapted to enable such coarse materials to be removed from the tank. The finer materials will be carried in suspension farther towards the overflow outlet before they are deposited in the bottom of the tank. The discharge 59 is so positioned as to enable these finer materials to be removed. If it is desired to classify and discharge materials in more grades than merely fine and coarse, it is necessary only to extend the length of the tank between the intake and the overflow outlet and to provide suitable discharges in the bottom of the tank along the space therebetween to allow discharge of the various grades of settled materials.

Assuming now that the supply contains only relatively coarse materials, substantially all of such will settle in the bottom of the tank in the location of the discharge valve 58, which is properly positioned for this purpose. When materials have settled up to the lower end of the baffle 67, the overflow outlet will be cut off and the unsettled material will rise in the tank and in the chamber 69 to cause the float 70 to rise in the tank and energize the magnet 64 to cause the discharge valve 62 to open and discharge the coarse settled materials, As shown in Fig. 9 more than one discharge may be located in the trough 60 to effect removal of the coarse materials. In the structure disclosed in this figure, I have shown in addition to the discharge 58, additional discharges 75, 76, 77 and 78, controlled respectively by valves 79, 80, 81 and 82. These additional discharge valves may be actuated by electromagnets such as 64 which are controlled, respectively, by additional floats 83, 84, 85 and 86 located in the chamber 69. These various floats just referred to may be located at the same level so that the various valves may be actuated simultaneously or, as shown, may be positioned at different levels in the chamber so as to be actuated successively as the level of the unsettled material rises in the tank and in the chamber.

If the supply introduced into the tank contains only relatively fine materials which will be settled out, substantially none of such will be deposited in the region of the pocket 60 but will be carried by the flow of unsettled materials between the supply intake and the overflow outlet over to the area in which is located the pocket 61. As these finer materials are settled in this area the level of such settled materials will rise to the bottom of the baffle 71 and thus cut off the overflow outlet, hence causing the level of the unsettled supply between the baffle 71 and the intake to rise and actuate the float 74, which will in turn cause the magnet 65 to open the discharge valve 63. Additional discharge valves similar to 63 may be located in the trough 61 to be controlled by suitable magnets operated by additional switch controlling floats in the chamber 73.

In the above described structure, it will be possible to settle and discharge materials from the tank whatever the proportion of coarse and fine constituents in the supply. The discharge 58 and similar discharges located relatively near the intake will take care of the coarse materials and discharge 59, and, if desirable, additional discharges may take care of the finer materials settled. In any case the proper actuating mechanism will be brought into operation in accordance with the rise in level of unsettled materials in the tank, which in turn will be determined by the rise in level of a particular grade of material which cooperates with the corresponding baffle to prevent further flow to the overflow outlet.

What I claim is:

1. A settling apparatus including a tank having a supply intake and a valved discharge, and means operable to control the valved discharge, said last mentioned means comprising a supply overflow, a receptacle vertically movable with respect to the tank and adapted to receive from and return to the tank through the overflow varying quantities of unsettled supply in accordance with variations in level of the supply in the tank with respect to the overflow, and means associated with the receptacle for actuating said valved discharge in accordance with vertical movement of the receptacle as determined by variations in quantity of the supply discharged into said receptacle.

2. A settling apparatus including a tank having a supply intake and a valved discharge, and means operable to control the valved discharge in accordance with variations in level of the unsettled supply in the tank, said last-mentioned means comprising a receptacle vertically movable with respect to the tank, and in open communication with said tank to allow flow of the unsettled supply to and fro between the tank and the receptacle, and means associated with said receptacle, for actuating the valved discharge in accordance with vertical movement of the receptacle as determined by the quantity of the unsettled supply therein.

3. A settling apparatus including a tank having a supply intake and a valved discharge, and means operable to control the valved discharge in accordance with variations in level of the unsettled supply in the tank, said last-mentioned means comprising a receptacle vertically movable with respect to the tank, a flexible conduit connecting the tank and receptacle to allow flow of the unsettled supply between the same, and means associated with the receptacle for actuating the valved discharge in accordance with vertical movement of the receptacle as determined by the quantity of the unsettled supply therein.

4. A settling apparatus including a tank having a supply intake, an overflow outlet and a valved discharge, means co-operative with materials settled in the tank to restrict flow to the overflow outlet and cause the level of the unsettled supply to rise in the tank, and means operable in accordance with variations in level of said supply to control the valved discharge, said last-mentioned means comprising a receptacle vertically movable with respect to the tank, a conduit associated with the tank and positioned to allow flow to and fro between the tank and the receptacle when the level of the unsettled supply rises and falls in the tank to predetermined levels, and means associated with the receptacle for actuating the valved discharge in accordance with vertical movement of the receptacle as determined by the flow between the tank and the receptacle.

5. A settling apparatus including a tank having a supply intake, a plurality of valved discharges in the bottom of the tank and an overflow outlet, means cooperative with materials settled in the tank for causing variations in level of the unsettled supply and means operable in accordance with variations in level of the unsettled supply to control the valved discharges, said last-mentioned means comprising independent actuating means for the several valved discharges so disposed one above the other at different levels in the tank as to actuate one of said valved discharges when the level of the supply is lower than the level at which the other valved discharge will be actuated.

6. A settling apparatus including a tank having a supply intake and an overflow outlet, a vertical baffle in said tank lying between said intake and said outlet and extending downwardly from the upper part of the tank to a point below said outlet, said baffle serving to restrict flow to the overflow outlet and to cause variations in level of the unsettled material on the supply side of the baffle in accordance with variations in level with respect to the lower end of the baffle of material settled in the bottom of the tank, a plurality of valved discharges located substantially below the lower end of the baffle, and means operable in accordance with variations in level of the supply to control the valved discharges, said last-mentioned means being disposed to actuate one of said valved discharges when the level of the supply is lower than the level at which the other valved discharge will be actuated.

7. A settling apparatus including a tank, a supply intake and an overflow outlet located at opposite ends of the tank, a plurality of valved discharges in the lower part of the tank spaced between the ends thereof, each discharge being adapted to discharge settled material of a particular grade as determined by the relative positions between the intake and outlet ends of the tank in which the various grades of materials settle, a plurality of baffles extending downwardly from the top of the tank to points short of the bottom, each baffle being disposed with respect to one of the above-mentioned valved discharges so that the grade of material settling in the locality of a particular valved discharge will co-operate with the corresponding baffle to restrict flow to the overflow outlet and cause the level of the unsettled material to rise in the tank on the supply side of that baffle, and means operable in accordance with variations in level of the unsettled supply for actuating the respective valved discharges.

In testimony whereof, I affix my signature.
JAMES MACDONALD MITCHELL.